United States Patent
Ricks et al.

(10) Patent No.: US 6,191,576 B1
(45) Date of Patent: Feb. 20, 2001

(54) METHOD OF OPERATING OR CONSTRUCTING A GEARTOOTH SENSOR

(75) Inventors: Lamar F. Ricks; Wayne A. Lamb, both of Freeport, IL (US); Peter G. Hancock, Plano, TX (US)

(73) Assignee: Honeywell Inc., Morristown, NJ (US)

( * ) Notice: Under 35 U.S.C. 154(b), the term of this patent shall be extended for 0 days.

(21) Appl. No.: 09/107,798

(22) Filed: Jun. 30, 1998

(51) Int. Cl.$^7$ .............. G01B 7/30; G01P 3/488; H03K 5/153; H03K 5/08
(52) U.S. Cl. .............. 324/207.2; 324/207.25; 324/207.12; 327/510
(58) Field of Search .............. 324/166, 173, 324/174, 207.12, 207.2, 207.21, 207.25, 251; 327/58, 60, 62, 72, 510–511, 516–517; 123/612, 617

(56) References Cited

U.S. PATENT DOCUMENTS

| | | | |
|---|---|---|---|
| 5,442,283 | 8/1995 | Vig et al. | 324/207.25 |
| 5,497,084 | 3/1996 | Bicking | 324/207.25 |
| 5,500,589 | 3/1996 | Sumcad | 324/202 |
| 5,650,719 | 7/1997 | Moody et al. | 324/166 |
| 5,694,038 | 12/1997 | Moody et al. | 324/207.25 |

FOREIGN PATENT DOCUMENTS

| | | |
|---|---|---|
| 0036950A | 10/1981 | (EP) . |
| 0759313A | 2/1997 | (EP) . |
| 0844736A | 5/1998 | (EP) . |
| 2309311A | 7/1997 | (GB) . |

*Primary Examiner*—Jay Patidar
(74) *Attorney, Agent, or Firm*—Roland W. Norris; Andrew A. Abeyta

(57) ABSTRACT

A geartooth sensor utilizes an algorithm for establishing an adaptive threshold for the switch point of the sensor to minimize drift in the point at which the sensor output changes in relation to the target features it is tracking. The algorithm utilizes measured waveform peak and average outputs and applies a separate empirically derived constant to each value to quickly obtain the major portion of the adaptive threshold value from the product of the first constant and the peak output, and to refine the threshold value further with the product of the second constant and the average output.

16 Claims, 2 Drawing Sheets

METHOD OF OPERATING OR CONSTRUCTING A GEARTOOTH SENSOR

This application is related to but in no way dependent upon U.S. Ser. 08/798,975; of common ownership herewith. (M10-16838)

BACKGROUND OF THE INVENTION

1. Field of the Invention

The present invention relates generally to position sensing apparatus and more particularly to magnetic effect sensing apparatus including linear position sensing as well as the commonly known rotary position "geartooth sensors" wherein a magnetically sensitive device senses a ferrous object or objects generally projecting from a rotating target and resembling the teeth of a gear.

2. Discussion of the Prior Art

Various sensors are known in the magnetic effect sensing arts. Examples of common magnetic effect sensors may include Hall effect and magnetoresistive technologies. Generally described, these magnetic sensors will respond to the change of magnetic field as influenced by the presence or absence of a ferromagnetic target object of a designed shape passing by the sensory field of the magnetic effect sensor. The sensor will then give an electrical output which can be further modified as necessary by subsequent electronics to yield sensing and control information. The subsequent electronics may be either onboard or outboard of the sensor package ital.

For example, geartooth sensors are known in the automotive arts to provide information to an engine controller for efficient operation of the internal combustion engine. One such known arrangement involves the placing of a ferrous target wheel on the crank shaft of the engine with the sensor located proximate thereto. The target objects, or features, i.e. tooth and slot, are of course properly keyed to mechanical operation of engine components.

Examples of United States patents in the related art include: U.S. Pat. Nos. 5,650,719; 5,694,038; 5,44,283; 5,414,355; 5,497,084 and 5,500,589.

It is well known in the art that the waveforms produced by the magnetic sensor change in response to varying airgap between the target and sensor faces. Also, differences among the biasing magnets used in the magnetic sensor, temperature, mechanical stresses, irregular target feature spacing, etc., can vary the sensor output. Therefore, the point at which the sensor changes state, i.e. the switch point, varies in time, or drifts, in relation to the degree of rotation of the target. But the mechanical action of the engine as represented by the target does not change. That is, there is a "true point" on the target in angle, or degrees of rotation, related to a hard-edge transition, which represents the point at which the sensor should change state to indicate a mechanical function of the engine. But, due to inherent limitations of the sensing system, the point at which the sensor changes state will vary by some amount from this true point. Therefore, the sensor is losing accuracy, e.g. not really giving a timing signal accurately representing piston travel. Therefore, the system controlled by the sensor can be inefficient. Several schemes are known in the art to reduce this sensor drift by providing an adaptive threshold of waveform voltage at which to switch the sensor. The adaptive threshold seeks to switch the sensor at a nearly constant angle in order to decrease switch point drift and increase accuracy of the sensor and efficiency of the engine.

Various known systems for producing an adaptive threshold (AT) include setting the adaptive threshold at a fixed level above a measured minimum magnetic bias signal. However, this function does not convey information proportional to air gap, therefore high accuracy is not achievable. Another method is setting the threshold at the average value of magnetic bias by using a time based integrator such as an RC circuit. While this method can yield high accuracy, the accuracy is not achieved until considerable amount of target rotation has taken place. It is more desirable to achieve the adaptive threshold point very quickly in the target rotation.

Other proposals, such as that proposed by U.S. Pat. No. 5,650,719, include digital schemes for tracking the voltage peak and voltage minimum of the output waveforms and selecting a point therebetween for the adaptive threshold and updating these peak and minimum values on a regular basis determined by a selected passage of target features.

However, all the known schemes for setting a threshold to compensate for the sensor drift to minimize switch point deviation suffer drawbacks. Such drawbacks may include increased circuit complexity, leading to increased expense; extensive target rotation before the adaptive threshold is determined; and lessened overall accuracy of the determined adaptive threshold for the waveform variance. Compromises among these negatives are inherent in any design. The present invention seeks to minimize the deleterious tradeoffs and provide a magnetic sensor which is an adequate balance of low cost, fast threshold acquisition time, and high accuracy.

SUMMARY OF THE INVENTION

The present invention discloses a method for operating a geartooth sensor. In another embodiment, the present invention discloses a method for constructing a geartooth sensing system. An empirically derived first constant (M1) is derived to account for anticipated output voltage fluctuations inherent in the target and the anticipated airgap tolerance range. The M1 constant is applied to the measured peak value ($B_{peak}$) or values of selected waveforms to obtain a value $B_{max}$. Using this value alone as the AT point eliminates the majority of drift in the sensor.

A second empirically derived constant ($M_2$) is derived and applied to a measured or time integrated average value ($B_{avg}$) of, e.g., each wave to obtain a low value ($B_{min}$). The average value referred to may be either a calculated arithmetical value or a time based value taking the form of median or mean values. $B_{max}$ and $B_{min}$ are then added to obtain the final adaptive threshold value (AT) which is up-dated at the sensor circuitry to eliminate another portion of drift and define accurate sensor output switch points.

$M_1$ and $M_2$ are empirically derived or modeled constants which are adapted to a specific target configuration and duty cycle as measured or modeled over the anticipated airgap tolerances of the specific application of the Hall sensor 11 with respect to target 13.

Because $B_{max}$ is derived from quickly acquired peak values, and because $B_{max}$ is the much larger value in the algorithm, the present invention synchronizes quickly while obtaining very good accuracy when the $B_{min}$ value is added at the slightly later time taken to acquire it.

Further, by utilizing the algorithm with its two empirically derived constants applied to the two waveform values, the need for performing calibration on the sensor and, e.g. adjusting its circuitry by laser trimming or the like, to improve sensor accuracy is minimized.

The AT point is held in the sensor circuitry, whether analog or digital, and may be updated at any chosen frequency to minimize the drift of the sensor switch points, thereby minimizing sensor inaccuracy and increasing engine efficiency.

BRIEF DESCRIPTION OF THE DRAWINGS

The present invention will be more fully and completely understood from a reading of the Description of the Preferred Embodiment in conjunction with the drawings, in which.

DESCRIPTION OF THE PREFERRED EMBODIMENT

Figure 1:
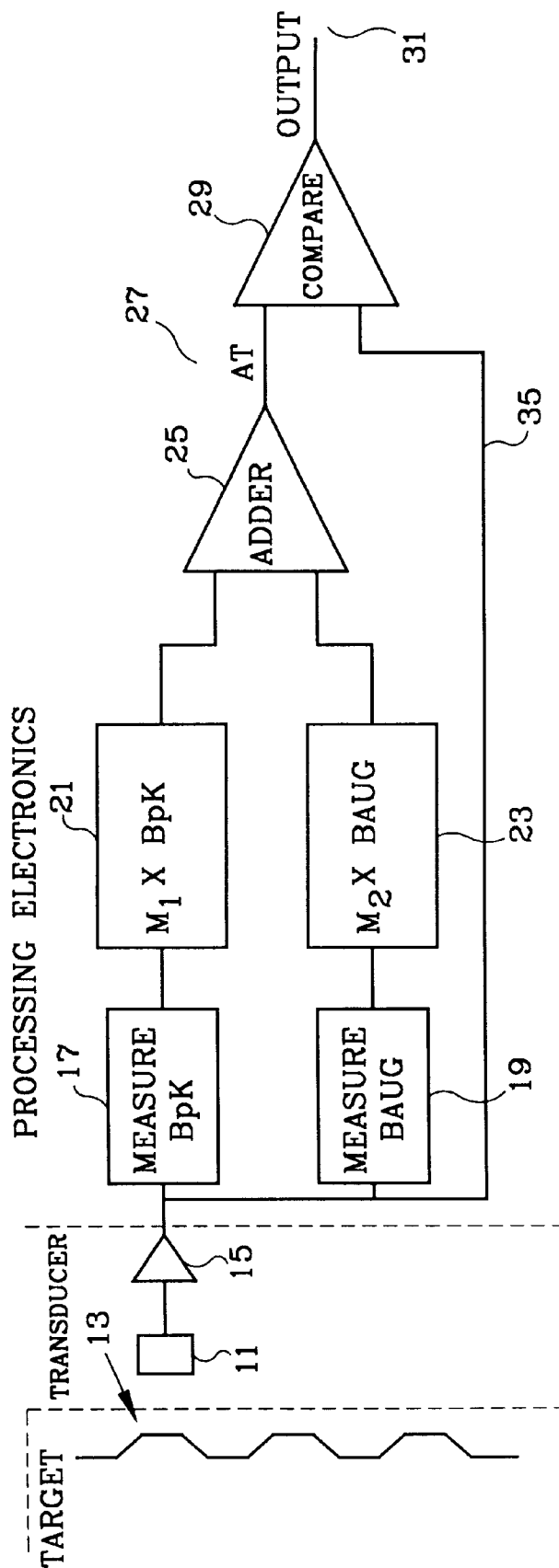
FIG. 1 is a block diagram schematic view of the sensor according to the present invention.

Throughout the Description of the Preferred Embodiment, like components will be identified by like reference numerals.

Referring to FIG. 1, a back biased Hall element sensor or the like 11 is placed in proximity to a ferrous geartooth target 13. As is known the excursions between the teeth and slots of the geartooth target 13 will affect the magnetic bias output of the Hall sensor 11. The output of the Hall is then sent to an amplifier 15 which produces a characteristic waveform (FIG. 2) which is dependent largely upon the airgap between the Hall sensor and the target, and may be affected by temperature and bias magnet strength. Also the amplified Hall output signal is then sent to measuring circuitry 17 to determine the peak ($B_{peak}$) of the waveforms. The design of such circuitry is considered within the skill of the ordinary artisan and need not be elaborated here. The amplified output is additionally sent to circuitry 19 to determine the average value ($B_{avg}$) of the waveforms at 19. Again, this circuitry is considered a matter of choice within the art and need not be detailed. The average could be an arithmetic calculation or derived from a time based integrator. It will of course be appreciated by the ordinarily skilled artisan that any variety of analog or digital implementation in hardware or software may be utilized to accomplish the electronic circuitry behind the Hall effect sensor.

Figure 2:
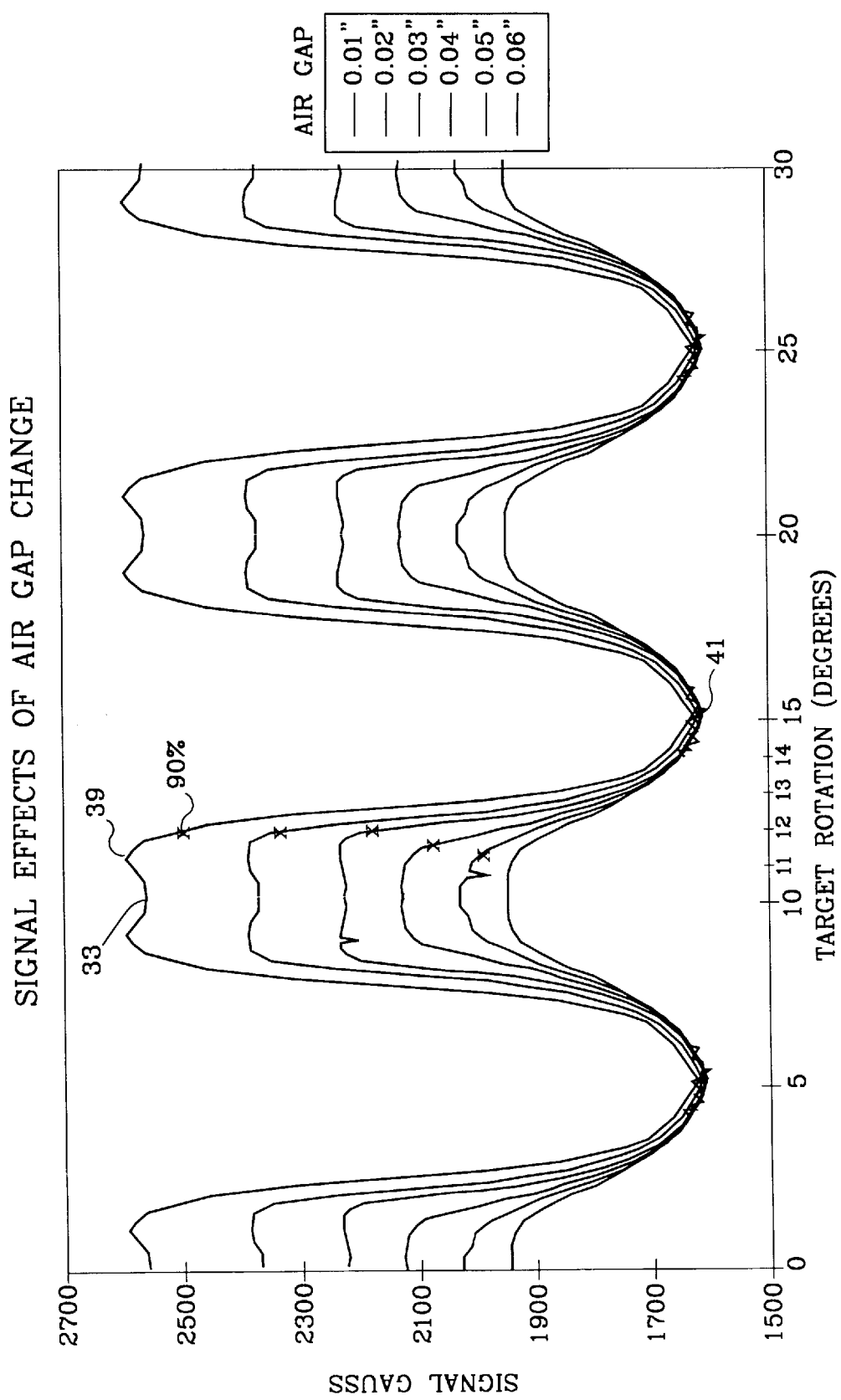
FIG. 2 illustrates a graph of plotted signal gauss waveforms (also referred to as magnetic transducer output waveforms) over a plurality of air gap distances between the sensor of the present invention and a rotating target.

The measured $B_{peak}$ value is then further processed at block 21 by applying a first constant $M_1$ to the peak value in order to establish the larger portion of the adaptive threshold which represents the majority of elimination of drift among the varying signals. As seen in FIG. 2, it is the peak 39 of the signal which varies most due to airgap variation while the minimum or bottom 41 of the waveform remains relatively constant.

The $B_{avg}$ value 19 is then sent to block 23 for applying a second constant $M_2$ to the average value to derive the value B-minimum. In analog circuitry the $M_1$ and $M_2$ values could, e.g., be fixed on an IC resistive network by laser trimming.

The adaptive threshold (AT) is selected to most closely approximate a line of values through the various airgap influenced waveforms to yield a switch point least varying in degrees relative to target rotation. $M_1$ and $M_2$ are constants which are derived from a specific target configuration and duty cycle over the anticipated airgap tolerances of the specific application of the Hall sensor 11 with respect to target 13. The $M_1$ constant is typically selected as a large percentage of the peak value $B_{peak}$. This value, $B_{peak}$, conveys the greatest amount of information about airgap. $B_{peak}$ is further the most quickly acquired value in the sensor circuitry, there being necessary only one tooth to pass the sensor in order to establish $B_{peak}$. Typical values could be, e.g., 0.7 to 0.9 for $M_1$. It is necessary to set $M_1$ at a value to ensure that the dips 33 in the waveform peaks do not interfere with proper sensor switching. $M_2$, on the other hand, is selected to be a much lower value, for example, 0.5, which is then applied to the determined $B_{avg}$, therefore yielding a much smaller number because $M_1$ is greater than $M_2$ and $B_{peak}$ is greater than $B_{avg}$. $B_{avg}$ is of course acquired later in time over several degrees of target rotation, i.e. the passage of a plurality of tooth and slot features on the target 13.

After the $M_1 \times B_{peak}$ and $M_2 \times B_{avg}$ values are established they are added, as at block 25, to establish the adaptive threshold value (AT) 27 which is the point on each air gap variant of the waveform corresponding to the least amount of drift and the most accurate representation of target rotation switch point for the sensor change in output state. The adaptive threshold (AT) is then applied to the sensor circuitry, as by comparison to actual sensor output represented by line 35, which is also applied to the comparator 29 in order to yield the most accurate sensor output 31.

Thus the function of the circuitry behind the Hall effect transducer and its initial amplifier is to obtain an adaptive threshold to control the change of state output of the sensor by utilizing the algorithm: $AT = M_1 \times B_{peak} + M_2 \times B_{avg}$ where AT is adaptive threshold, $B_{peak}$ is measured maximum value of the waveform, $B_{avg}$ is measured average value of the waveform, and $M_1$ and $M_2$ are empirically derived constants applied to $B_{peak}$ and $B_{avg}$, respectively, when taking into account the target design, duty cycle and expected waveform variations over a variety of operating conditions including expected airgap tolerance.

Because the present invention utilizes both $B_{peak}$, which contains the most information about airgap variation signal effect, and $B_{avg}$ which contains duty cycle information and is a highly accurate indicator of waveform switch point drift, the sensor of the present invention yields a good balance of speed of adaptive threshold acquisition, overall accuracy, and averaging consistency since measurement is not necessarily required of every peak and valley excursion of the waveform. Further, because the present invention yields a highly accurate and adaptive threshold for the switch point, sensor calibration of individual sensors is not necessary during manufacture to yield predictable and accurate results.

While the present invention has been described in terms of a specific embodiment, it will of course be appreciated that many variations will occur to a person have ordinary skill in the art and that the present invention may be implemented in a variety of electrical hardware and software formats in either analog or digital domains.

Having thus described the invention what is claimed is:

1. A method of operating a geartooth sensor comprising the steps of:

(a) obtaining at least one amplified sensor transducer waveform;

(b) periodically measuring the peak output ($B_{peak}$) from the sensor transducer waveform and multiplying the peak output by a first constant ($M_1$) resulting in a first product;

(c) obtaining an average output of the sensor transducer waveform ($B_{avg}$) and multiplying the average output by a second constant ($M_2$) resulting in a second product;

(d) adding the first and second products to obtain an adaptive threshold;

(e) comparing the adaptive threshold to the sensor transducer waveform to result in an output; and (f) utilizing the output as a switch point to set the operational characteristics of the geartooth sensor.

2. A method of operating a geartooth sensor according to claim 1 further comprising the step of:

obtaining the average output by a running calculation of output values.

3. A method of operating a geartooth sensor according to claim 1 further comprising the step of:

obtaining the average output by deriving it with a time based integrator.

4. A method of operating a geartooth sensor according to claim 1 further comprising the step of:

utilizing the first constant to achieve the least drift from the true point over a range of airgap tolerances.

5. A method of operating a geartooth sensor according to claim 1 further comprising the step of:

determining the second constant for multiplication with the average output value which achieves least drift from a true point over a range of airgap tolerances when added to $M_1$ times $B_{peak}$.

6. A method of operating a geartooth sensor according to claim 1 wherein both constants are less than 1.0.

7. A method of operating a geartooth sensor according to claim 1 wherein $M_1$ is greater than $M_2$.

8. A method of operating a geartooth sensor according to claim 1 further comprising the step of:

determining $B_{peak}$ and $B_{avg}$ by a digital processor.

9. A method of operating a geartooth sensor according to claim 1 further comprising the step of:

determining $B_{peak}$ and $B_{avg}$ by means of analog circuitry.

10. A method for constructing a sensing system for a rotating target comprising the steps of:

(a) graphically plotting a plurality of output waveforms from a magnetic sensor transducer over a range of airgaps within an expected operating range of airgaps between the target and the sensing system;

(b) deriving a constant $M_1$;

(c) deriving a constant, $M_2$; and;

(d) acquiring $B_{peak}$ and $B_{avg}$ during operation of the sensor, $B_{peak}$ corresponding to the peak Gaussian output waveform and $B_{avg}$ corresponding to the average gaussian output waveform and multiplying $B_{peak}$ and $B_{avg}$ times $M_1$ and $M_2$, respectively, resulting in a first product and a second product, and adding the first and second products thereof resulting in an adaptive threshold switch point which represents an amount of least drift of the sensor switch point from at least one reference point on the target to set the operational characteristics of the sensor.

11. A method of operating a geartooth sensor comprising the steps of:

(a) periodically obtaining a peak output ($B_{peak}$) of a sensor transducer and applying a first constant ($M_1$) to the peak output to derive a first value ($B_{max}$);

(b) obtaining an average output of the sensor transducer ($B_{avg}$) and applying a second constant ($M_2$) to the average to obtain a second value ($B_{min}$);

(c) combining the first and second values, $B_{max}$ and $B_{min}$, to obtain an adaptive threshold; and (d) applying the adaptive threshold as a switch point to set the operational characteristics of the sensor transducer.

12. A geartooth sensor comprising:

(a) means for periodically obtaining the peak output ($B_{peak}$) of the sensor transducer and applying a first constant ($M_1$) to $B_{peak}$ to obtain a first value ($B_{max}$);

(b) means for obtaining the average output of the sensor transducer ($B_{avg}$) and applying a second constant ($M_2$) to $B_{avg}$ to obtain a second value ($B_{min}$);

(c) means for combining $B_{max}$ and $B_{min}$ to obtain an adaptive threshold; and (d) means for applying the adaptive threshold as a switch point to set the operational characteristics of the sensor transducer.

13. The geartooth sensor according to claim 12 wherein both constants are less than 1.0.

14. The geartooth sensor according to claim 12 wherein $M_1$ is greater than $M_2$.

15. A method of operating a geartooth sensor according to claim 12 further comprising the step of:

digital processing means for obtaining the values $M_1 \times B_{peak}$ and $M_2 \times B_{avg}$.

16. A method of operating a geartooth sensor according to claim 12 further comprising:

analog processing means for obtaining the values $M_1 \times B_{peak}$ and $M_2 \times B_{avg}$.

* * * * *